United States Patent
Namiki et al.

(10) Patent No.: US 9,888,162 B2
(45) Date of Patent: Feb. 6, 2018

(54) IMAGE PROCESSING APPARATUS, IMAGE PROCESSING METHOD, AND STORAGE MEDIUM HAVING A CHANGING UNIT THAT CHANGES A READ REGION DEPENDING ON A REPRODUCTION MODE

(71) Applicant: CANON KABUSHIKI KAISHA, Tokyo (JP)

(72) Inventors: Kazuhiro Namiki, Yokohama (JP); Manabu Sakakibara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 14/868,870

(22) Filed: Sep. 29, 2015

(65) Prior Publication Data

US 2016/0112625 A1  Apr. 21, 2016

(30) Foreign Application Priority Data

Oct. 20, 2014 (JP) ................................ 2014-213646
Oct. 20, 2014 (JP) ................................ 2014-213649

(51) Int. Cl.
H04N 5/232 (2006.01)
H04N 9/79 (2006.01)
H04N 5/77 (2006.01)
H04N 5/783 (2006.01)
H04N 9/804 (2006.01)

(52) U.S. Cl.
CPC ..... *H04N 5/23212* (2013.01); *H04N 5/23229* (2013.01); *H04N 5/772* (2013.01); *H04N 5/783* (2013.01); *H04N 9/79* (2013.01); *H04N 9/8042* (2013.01)

(58) Field of Classification Search
CPC .................................................. H04N 5/23212
USPC ........................................................ 348/239
See application file for complete search history.

(56) References Cited

U.S. PATENT DOCUMENTS

| | | | |
|---|---|---|---|
| 4,410,804 A | 10/1983 | Stauffer | |
| 9,036,072 B2* | 5/2015 | Nagamatsu | H04N 5/23212 348/333.02 |
| 2002/0100921 A1* | 8/2002 | Mabuchi | H01L 27/14621 257/222 |

OTHER PUBLICATIONS

Ren Ng, et al. "Light Field Photography with a Hand-held Plenoptic Camera", Stanford Tech Report CTSR 2005-02, Apr. 20, 2005, pp. 1-8, Stanford University, California, U.S.A.

* cited by examiner

Primary Examiner — Joel Fosselman
(74) Attorney, Agent, or Firm — Fitzpatrick, Cella, Harper & Scinto

(57) ABSTRACT

An image processing apparatus functions as an image data generating unit that generates image data based on a signal received from an image pickup element including a unit pixel including a plurality of pixels allocated to each of a plurality of microlenses, a frame image generating unit that generates a frame image for reproduction of a moving image based on data, within the image data, read from a predetermined read region of the unit pixel, and a changing unit that changes the predetermined read region of the unit pixel for the frame image generating unit depending on a reproduction mode relating to the reproduction of the moving image. The reproduction mode comprises a normal reproduction mode and a search reproduction mode. A moving image reproduction speed for the search reproduction mode is higher than a moving image reproduction speed for the normal reproduction mode.

7 Claims, 15 Drawing Sheets

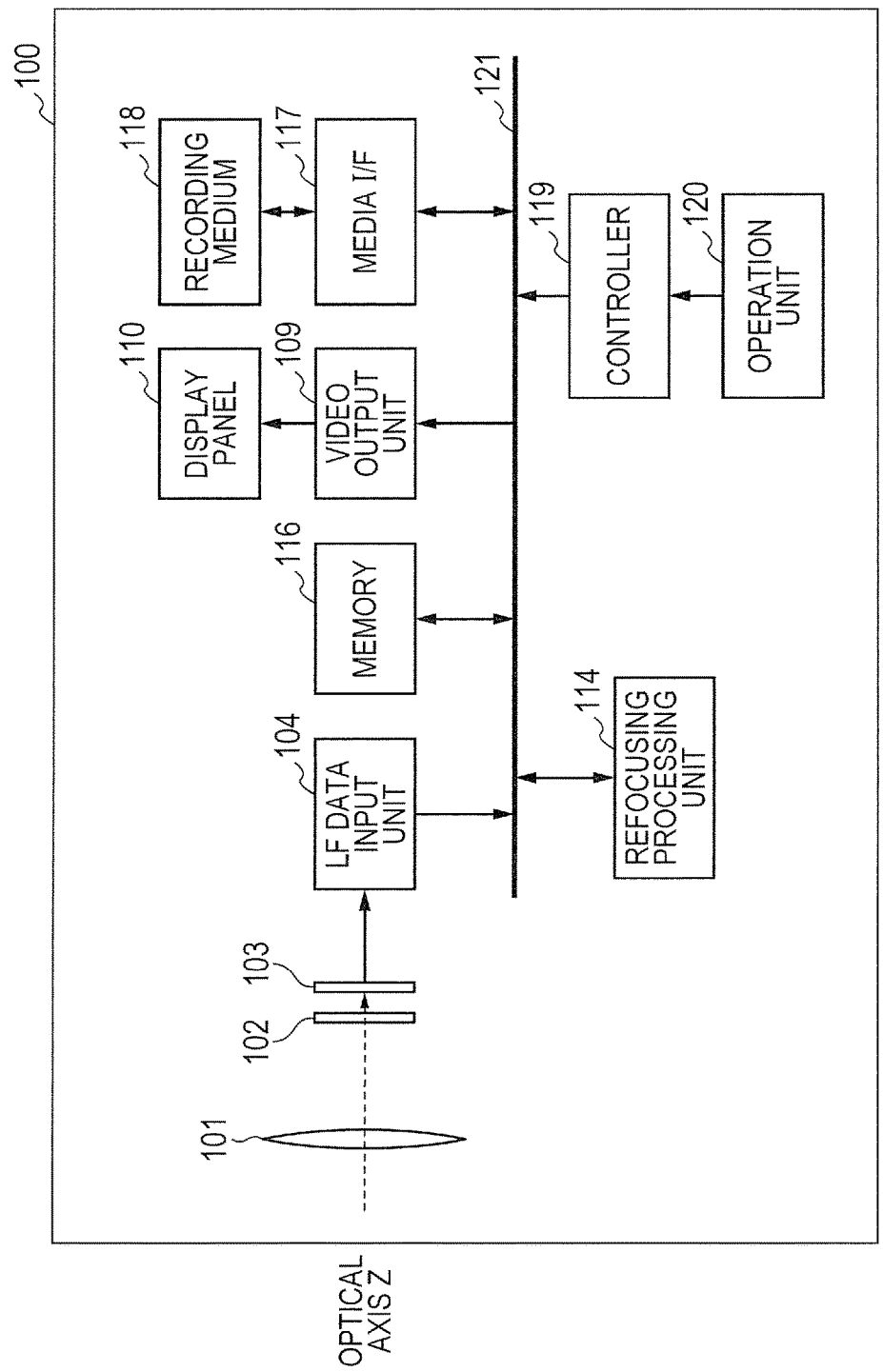

IMAGE PROCESSING APPARATUS, IMAGE PROCESSING METHOD, AND STORAGE MEDIUM HAVING A CHANGING UNIT THAT CHANGES A READ REGION DEPENDING ON A REPRODUCTION MODE

BACKGROUND OF THE INVENTION

Field of the Invention

The present invention relates to an image processing apparatus, an image processing method, and a storage medium.

Description of the Related Art

In recent years, there is proposed a camera called "light field camera" as a camera capable of changing a focus position after photographing. This camera obtains, in addition to positional information indicating a position on an image pickup plane into which a light beam reflected from an object is entered, light beam information including angular information indicating an incident angle. The light beam information is called "light field data" (hereinafter referred to as "LF data").

In Ren Ng et al. "Light Field Photography with a Handheld Plenoptic Camera", Stanford Tech Report CTSR 2005-02, there is disclosed an image pickup apparatus in which a large number of microlenses are arranged between a main lens and an image pickup element. The image pickup apparatus is configured to separate the entered light beam by the microlenses and receive each of the light beams obtained through the light separation by the image pickup element, to thereby obtain the LF data. In the above-mentioned literature, there is also disclosed a refocusing technology for computing image data on a virtual imaging plane by using the LF data, to thereby generate an image in a focus position different from a focus position when photographing.

In U.S. Pat. No. 4,410,804, there is disclosed an image pickup apparatus using a two-dimensional image pickup element in which one microlens and a plurality of divided photoelectric converters are formed for one pixel. The divided photoelectric converters are configured to receive, through one microlens, light passing through different pupil part regions of an exit pupil of a photographing lens. Photoelectric conversion signals received from those respective divided photoelectric converters allow a plurality of parallax images corresponding to the divided pupil part regions to be generated. Through use of the obtained plurality of parallax images, a portion to be focused on is subjected to combining processing, to thereby allow the focus position to be changed after photographing.

Such a light field processing technology as described above can also be applied to a moving image photographing. In reproduction of data having a moving image format, search reproduction such as fast-forward or rewinding, which is not conducted in reproduction of data having a still image format, may be conducted. A light field image may be refocused by a user, and a refocused image having a small depth of field is often used as the light field image. This raises a problem in that, when the search reproduction of a moving image is conducted with the image having a small depth of field, the moving image is poor in visibility for the user, and a desired scene is hard to find.

SUMMARY OF THE INVENTION

According to one embodiment of the present invention, there is provided an image processing apparatus, including: a refocused-image generating unit configured to generate a refocused image having a focus position changed by using image data including information indicating a direction and an intensity of a light beam entered from an object; and a depth-of-field setting unit configured to set a depth of field of the refocused image to be used for reproduction of a moving image based on a type of reproduction mode for the moving image.

Further, according to another embodiment of the present invention, there is provided an image processing apparatus, including: an image data generating unit configured to generate image data based on a signal received from an image pickup element including a unit pixel including a plurality of pixels allocated to each of a plurality of microlenses; a frame image generating unit configured to generate a frame image for reproduction of a moving image based on data, within the image data, read from a predetermined read region of the unit pixel; and a changing unit configured to change the read region of the unit pixel for the frame image generating unit depending on a reproduction mode relating to the reproduction of the moving image.

Further features of the present invention will become apparent from the following description of exemplary embodiments with reference to the attached drawings.

BRIEF DESCRIPTION OF THE DRAWINGS

FIG. 1 is a block diagram for illustrating a configuration of an image processing apparatus according to a first embodiment of the present invention.

DESCRIPTION OF THE EMBODIMENTS

Figure 2A:
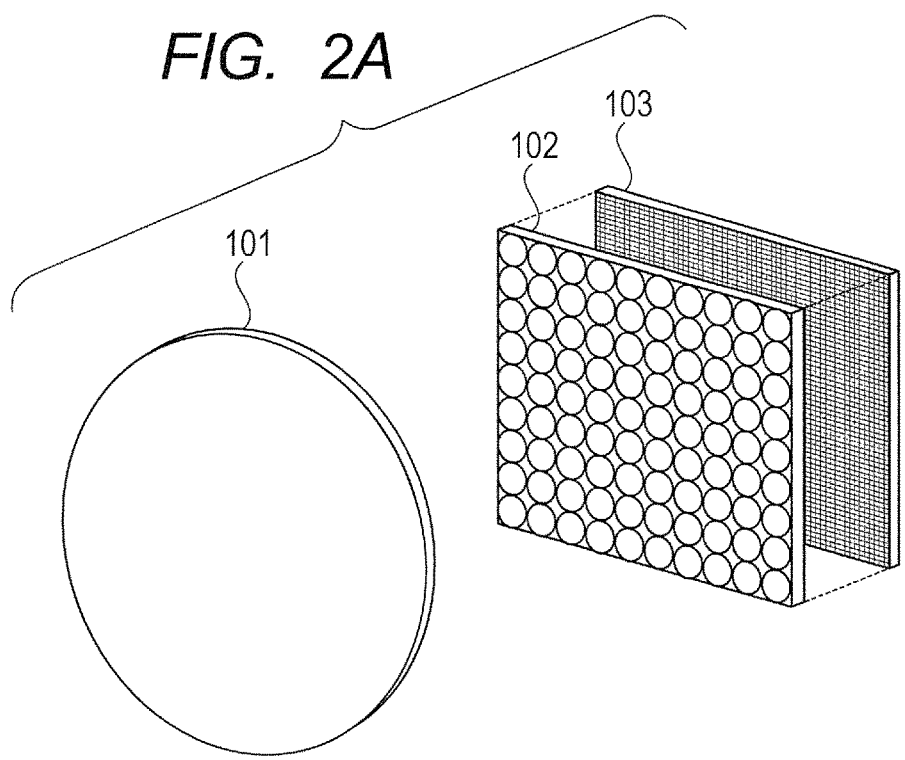
FIG. 2A is a diagram for illustrating a positional relationship among a main lens, a microlens, and an image pickup element.

Preferred embodiments of the present invention will now be described in detail in accordance with the accompanying drawings.

(First Embodiment)

An image processing apparatus according to a first embodiment of the present invention is described. FIG. 1 is a block diagram for illustrating a configuration of the first embodiment.

An image processing apparatus 100 includes a main lens 101 serving as a photographing lens, a microlens array 102, an image pickup element 103, an LF data input unit 104, a video output unit 109, a display panel 110, a refocusing processing unit 114, a memory 116, a media I/F 117, and a recording medium 118. Further, the image processing apparatus 100 includes a controller 119, an operation unit 120, and a memory bus 121.

The main lens 101 is an imaging optical system formed of a single lens or a plurality of lenses, and light reflected from an object and entered along an optical axis Z direction (from the left side of FIG. 1) is emitted to the microlens array 102. The microlens array 102 is formed of a plurality of microlenses (not shown), and arranged between the main lens 101 and the image pickup element 103. The light entered from the main lens 101 is separated based on an incident angle by the microlens array 102, and emitted to the image pickup element 103. More specifically, the microlens array 102 is arranged in the vicinity of a focus position of the main lens 101. The light passing through different pupil regions of the main lens 101 is split for each pupil region to be emitted.

The image pickup element 103 is a CCD sensor or a CMOS sensor in which a plurality of pixels (photoelectric conversion elements) configured to subject the light entered from the microlens array 102 to photoelectric conversion to convert the light into an electric signal are arranged in a matrix shape. The image pickup element 103 outputs the electric signal generated by the photoelectric conversion to the LF data input unit 104, which serves as an image data generating unit, as an image pickup signal.

The LF data input unit 104 converts the image pickup signal input from the image pickup element 103 into a digital signal, and converts the digital signal into LF data by conducting therefor development processing for converting the digital signal into a predetermined image file format such as Joint Photographic Experts Group (JPEG) in units of image pickup frames. The LF data input unit 104 stores the converted LF data into an LF data area serving as a buffer area within the memory 116. The development processing represents processing for changing or adjusting image quality of digital image data by using a parameter relating to the digital image data for color correction, resolution, image compression, or the like.

The video output unit 109 reads refocused video from a video signal area of the memory 116, and outputs the refocused video to the display panel 110 and a video output terminal (not shown). The display panel 110 displays a video signal input from the video output unit 109 as video. The display panel 110 displays a refocused image being photographed when photographing, and displays an image of the LF data corresponding to a type of reproduction mode when reproducing a moving image.

The refocusing processing unit 114 serving as a frame image generating unit reads the LF data stored in the LF data area of the memory 116 by the media I/F 117 in a normal reproduction (refocusing reproduction) mode and a search reproduction mode that is high speed reproduction, and subjects the LF data to refocusing processing. Video data generated in the refocusing processing is stored in the video signal area of the memory 116.

Note that, the normal reproduction mode is a reproduction mode that allows a user to view the moving image. In the normal reproduction mode, the reproduction is typically conducted at approximately the same reproduction speed as at the time of photographing. The search reproduction mode is a reproduction mode including operations, such as fast-forward and rewinding, which allow the user to search for a desired scene within the moving image. The search reproduction mode enables the reproduction to be conducted at a higher speed than in the normal reproduction mode. In the search reproduction mode, the high speed reproduction is typically conducted by skipping a part of images that form the moving image, but may be conducted by increasing the number of frames to be displayed per unit time.

The memory 116 is a dynamic random access memory (RAM) that allows high speed random access, and is used as a work memory. The memory 116 is used as, for example, the LF data area and the video signal area. The memory 116 may include a read only memory (ROM). The ROM included in the memory 116 may store various programs that allow the controller 119 to operate and data therefor.

The media I/F 117 is an interface configured to control data to be read from and written to the recording medium 118. At the time of photographing, in response to an instruction signal from the controller 119, the media I/F 117 reads the LF data stored in the LF data area of the memory 116 by the LF data input unit 104, namely, the LF data during photographing, and stores the LF data onto the recording medium 118. At a time of normal reproduction, in response to an instruction signal from the controller 119, the media I/F 117 reads all pieces of data of the recorded LF data from the recording medium 118, and stores all the pieces of data into the LF data area of the memory 116. At a time of search reproduction, in response to an instruction signal from the controller 119, the media I/F 117 reads the recorded LF data from the recording medium 118 for every predetermined number of frames (for example, for every four frames in a case of four-times speed reproduction), and stores the LF data into the LF data area of the memory 116.

The recording medium 118 is a recording medium such as a hard disk drive or a non-volatile semiconductor memory (for example, flash memory). The recording medium 118 records data in a file system format such as a file allocation table (FAT).

The controller 119 serving as a changing unit is a controller configured to control an entire system of the image processing apparatus 100, and is a so-called central processing unit (CPU). Based on an operation conducted by the user (not shown) through the operation unit 120, the controller 119 controls the operation mode of the image processing apparatus 100 among an image pickup mode for executing photographing, the normal reproduction mode (alternatively referred to also as "refocusing reproduction mode"), the search reproduction mode that is the high speed reproduction, and the like.

The operation unit 120 is an operation unit to be operated by the user, and includes buttons such as a shutter button, a recording button for picking up a moving image, a reproduction button for reproducing the picked-up moving image, and a setting button for conducting various settings and a touch panel sensor arranged on a front surface of the display panel 110. By operating the operation unit 120, the user is allowed to change the operation mode among the photographing mode, the normal reproduction mode (refocusing reproduction mode), and the search reproduction mode. When the user operates the operation unit 120, various operation signals are transmitted from the operation unit 120 to the controller 119.

The LF data input unit 104, the video output unit 109, the refocusing processing unit 114, the memory 116, the media I/F 117, and the controller 119 are connected to the memory bus 121. The LF data input unit 104, the video output unit 109, the refocusing processing unit 114, the media I/F 117, and the controller 119 write and read data to and from the memory 116 through the memory bus 121. The memory bus 121 adjusts memory access requests received from the respective components, and controls the data to be read from and written to the memory 116 in time division.

Next, operations of the main lens 101, the microlens array 102, the image pickup element 103, and the LF data input unit 104 conducted at the time of photographing are described in detail with reference to FIG. 2A, FIG. 2B, FIG. 3, and FIG. 4.

FIG. 2A is a schematic diagram for illustrating a positional relationship among the main lens 101, the microlens array 102, and the image pickup element 103. As illustrated in FIG. 2A, the microlens array 102 is located between the main lens 101 and the image pickup element 103, and includes a plurality of microlenses 102a arranged in a matrix shape. Note that, a size of the microlens 102a and the number of microlenses 102a according to this embodiment are not limited to ones that are illustrated in FIG. 2A.

Figure 2B:
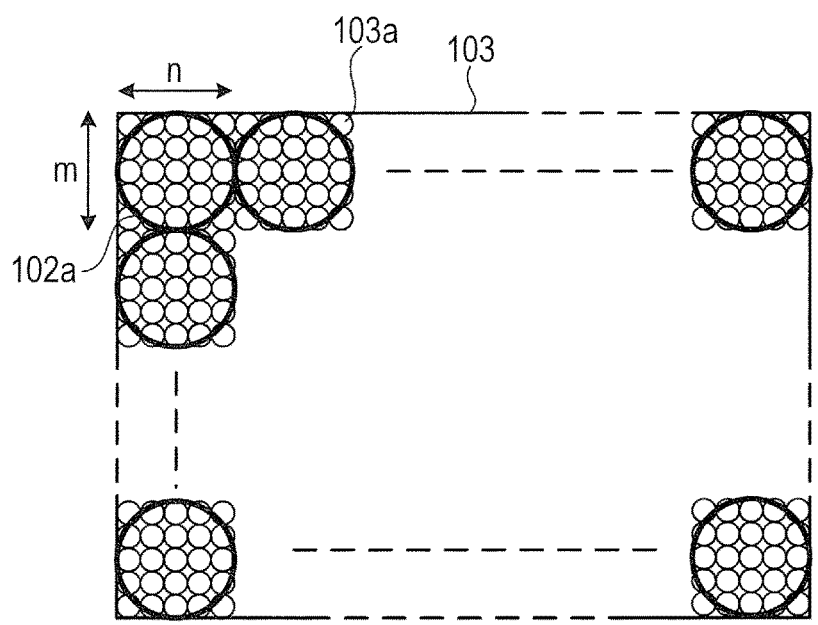
FIG. 2B is a diagram for illustrating a correspondence relationship between microlenses and pixels.

Further, FIG. 2B is a diagram for illustrating a correspondence relationship between the microlenses 102a and the pixels 103a included in the image pickup element 103 when viewed from the optical axis Z direction. As illustrated in FIG. 2B, each of the microlenses 102a is arranged so as to correspond to n×m pixels 103a within the image pickup element 103. A division number of a light beam is determined by the number of (that is, n×m) pixels 103a corresponding to each of the microlenses 102a. FIG. 2B is an illustration of an exemplary state in which 5×5 pixels 103a are arranged for one microlens 102a. The n×m pixels 103a are hereinafter referred to also as "unit pixel".

Figure 3:
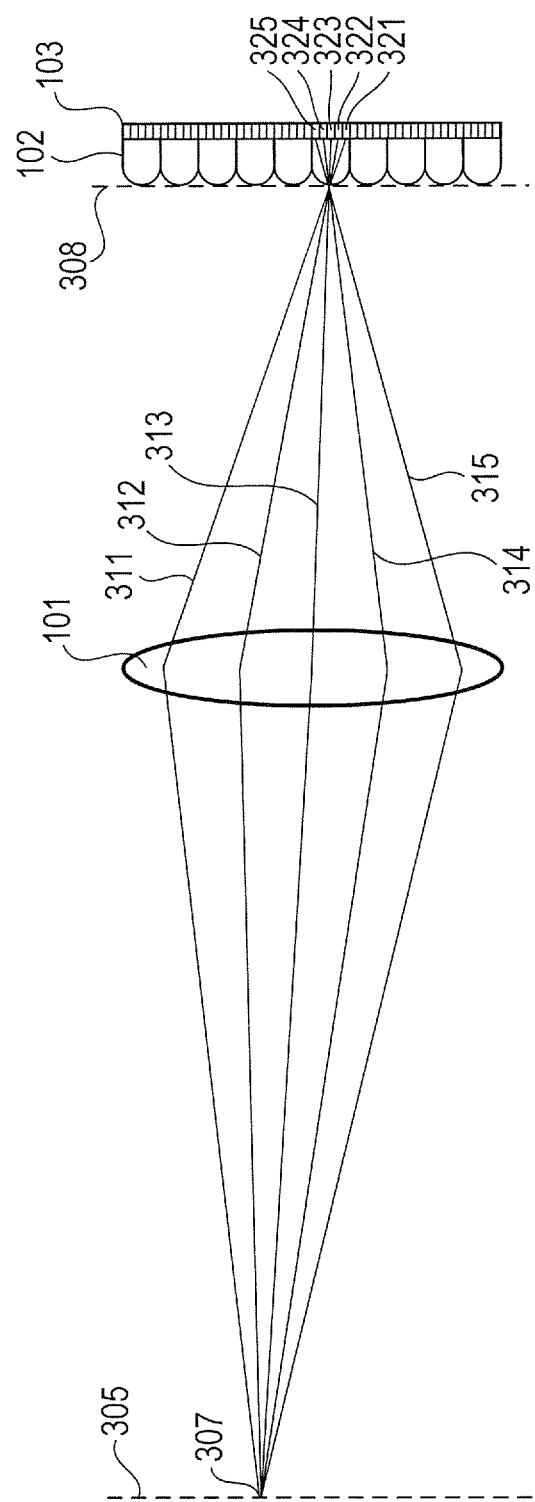
FIG. 3 is a diagram for illustrating an optical path of light emitted from an object and entered into the image pickup element.

FIG. 3 is a diagram for illustrating an optical path of incident light on the main lens 101, the microlens array 102, and the image pickup element 103. A light flux emitted from a point 307 that is one point within an object 305 is entered into the main lens 101. The entered light flux is condensed by the main lens 101, to be projected onto an imaging plane 308 on a front surface of the microlens 102a. The projected light is separated based on the incident angle of the light by the microlens 102a, and received by pixels 321 to 325 of the image pickup element 103. The light received by the pixels 321 to 325 is subjected to photoelectric conversion, to be output as the image pickup signal.

The light received by the pixel 321 is the light flux passing through an optical path 311. In the same manner, the light received by the pixels 322 to 325 is the light flux passing through optical paths 312 to 315, respectively. In other words, the light received by the pixels 321 to 325 is the light emitted from the same point 307 but received by different pixels depending on the incident angle of the light beam.

The image pickup signal output from the image pickup element 103 is input to the LF data input unit 104. The LF data input unit 104 converts the image pickup signal into a digital signal, converts the digital signal into the LF data by conducting therefor the development processing, and stores the LF data into the LF data area of the memory 116. After that, the LF data stored in the memory 116 is recorded onto the recording medium 118 by the controller 119.

Next, signal processing to be conducted at the time of normal reproduction is described. The controller 119 reads all pieces of data corresponding to one frame of the LF data stored on the recording medium 118 through the media I/F 117, and stores all the pieces of data into the LF data area within the memory 116. The refocusing processing unit 114 conducts the refocusing processing based on the LF data stored in the LF data area of the memory 116, and stores the frame image data into a frame image data area of the memory 116. The refocusing processing is described later.

The above-mentioned operation is performed continuously to create the frame image data corresponding to the number of frames that can be processed as the moving image data in the frame image data area of the memory 116. The video output unit 109 generates a moving image signal by conducting processing for reading the frame image data from the frame image data area of the memory 116 and generating the moving image. The generated moving image signal is output to the display panel 110, and the video of the moving image is displayed on the display panel 110.

Next, generation of the refocused image conducted by the refocusing processing unit 114 is described in detail. Specifically, the refocused image is generated as follows based on a "light field photography" method.

Figure 4:
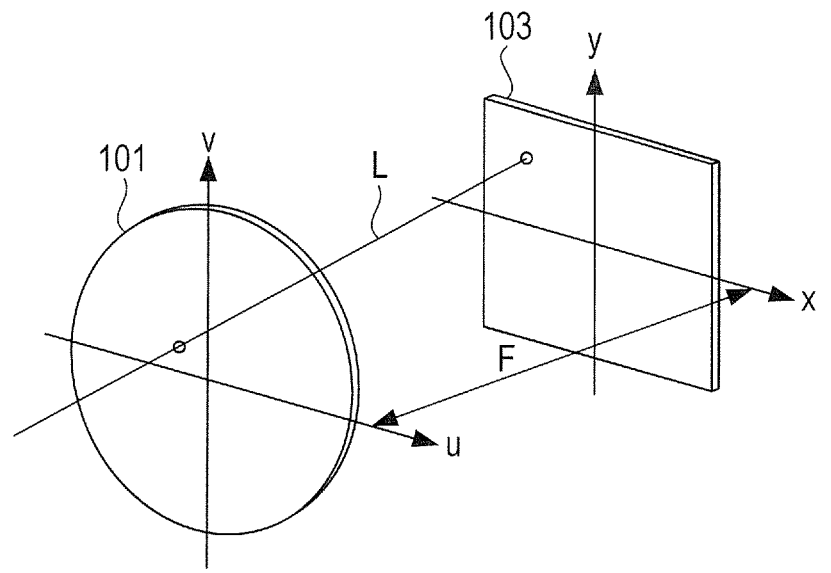
FIG. 4 is a schematic diagram for illustrating a positional relationship between the main lens and the image pickup element.

First, a function $L_F(x,y,u,v)$ indicating light beam information is described. FIG. 4 is a schematic diagram for illustrating a simplified positional relationship between the main lens 101 and the image pickup element 103. Coordinate axes of the main lens 101 are set as u and v, coordinate axes of the image pickup element 103 are set as x and y, and a distance between the main lens 101 and the image pickup element 103 is set as F. At this time, a light beam L passing through the main lens 101 and the image pickup element 103 is defined by a four-dimensional function $L_F(x,y,u,v)$.

Figure 5:
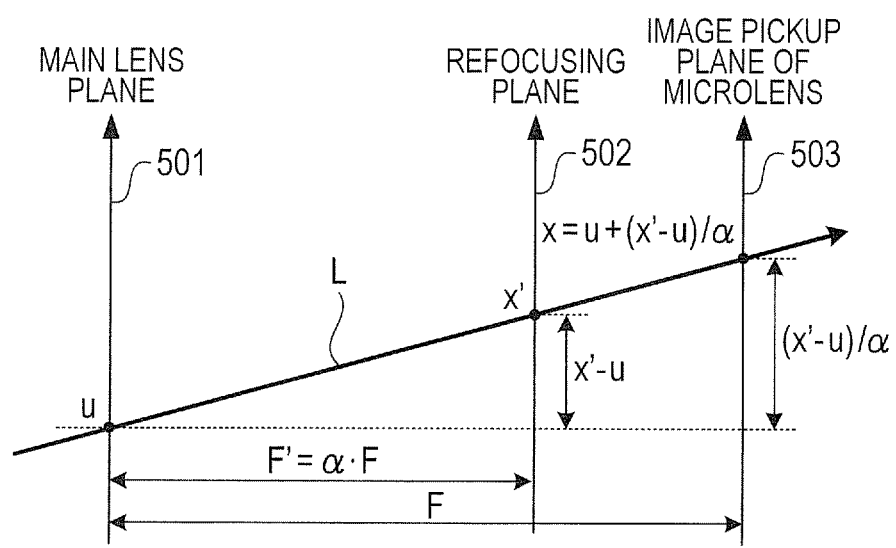
FIG. 5 is a schematic diagram for illustrating a positional relationship among a main lens plane, a refocusing plane, and an image pickup plane of the microlens.

Next, a computation method involved in the generation of the refocused image is described. FIG. 5 is a diagram for illustrating a positional relationship among a main lens plane 501, a refocusing plane 502 defined by a refocusing coefficient α, and an image pickup plane 503 of the microlens. In FIG. 5, a position of a pupil division region on the main lens plane 501 is set as coordinates (u,v), a pixel position in a refocusing plane is set as coordinates (x',y'), the position in an image pickup plane of the microlens is set as coordinates (x,y), and a distance between the main lens plane 501 and the refocusing plane 502 is set as F'. The light beam L is entered from a point u on the main lens plane 501, and passes through a point x' on the refocusing plane 502, to reach a point x on the image pickup plane 503 of the microlens. In this case, the light beam L traveling in a straight line passes through the point x' on the refocusing plane 502 and the point x on the image pickup plane 503 of the microlens, and hence $x=u+(x'-u)/\alpha$. In the same manner, an optical signal of the light beam entered from the coordinates (u,v) on the main lens plane 501 to pass through the coordinates (x',y') on the refocusing plane 502, which is received by the image pickup plane 503 of the microlens, may be expressed by Expression (1) by using the function $L_F(x,y,u,v)$ indicating the light beam L.

$$L_{F'}(x', y', u, v) = L_{(\alpha \cdot F)}(x', y', u, v) \qquad (1)$$
$$= L_F\left(u + \frac{x'-u}{\alpha}, v + \frac{y'-v}{\alpha}, u, v\right)$$
$$= L_F\left(u\left(1 - \frac{1}{\alpha}\right) + \frac{x'}{\alpha}, y\left(1 - \frac{1}{\alpha}\right) + \frac{y'}{\alpha}, u, v\right)$$

Further, a refocused image $E_{F'}(x',y')$ obtained in the coordinates (x',y') on the refocusing plane 502 is obtained by integrating the function $L_F(x,y,u,v)$ with respect to a u-axis and a v-axis of the main lens plane 501, and may be therefore expressed by Expression (2). That is, the refocused image $E_{F'}(x',y')$ is obtained by integrating the function $L_F(x,y,u,v)$ with respect to the pupil division region of the main lens 101. The refocused image is generated by computation processing of Expression (2).

$$E_{F'}(x', y') = \frac{1}{F'^2} \int\int L_{(\alpha \cdot F)}(x', y', u, v) du dv \qquad (2)$$
$$= \frac{1}{\alpha^2 F^2} \int\int L_F\left(u\left(1 - \frac{1}{\alpha}\right) + \frac{x'}{\alpha}, v\left(1 - \frac{1}{\alpha}\right) + \frac{y'}{\alpha}, u, v\right) du dv$$

As described above, the image data including information indicating a direction and an intensity of the light beam entered from the object, which is obtained on the image pickup plane 503 of the microlens, may be used to calculate the refocused image $E_{F'}(x',y')$ on the refocusing plane. The refocusing plane may be set at any position, and hence this method allows a focus position to be changed to any position after photographing.

Figure 6:
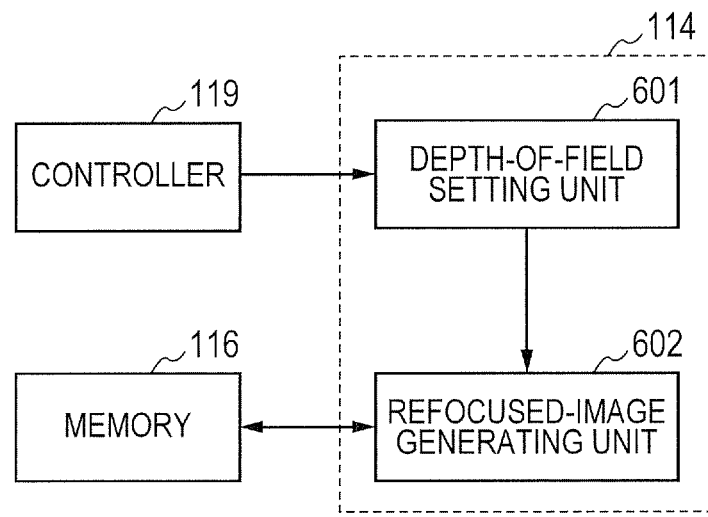
FIG. 6 is a diagram for illustrating a further detailed configuration of a refocusing processing unit according to the first embodiment.
Figure 7:
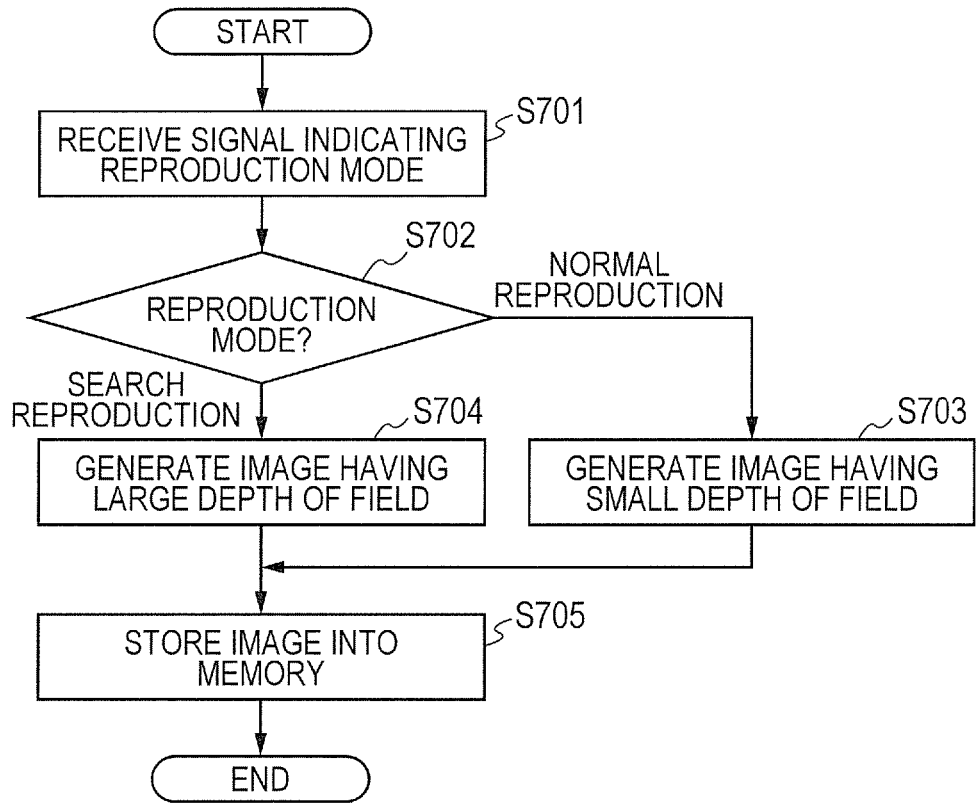
FIG. 7 is a flowchart for illustrating processing conducted by the refocusing processing unit according to the first embodiment.

FIG. 6 is a diagram for illustrating a further detailed configuration of the refocusing processing unit 114. The refocusing processing unit 114 includes a depth-of-field setting unit 601 and a refocused-image generating unit 602. FIG. 7 is a flowchart for illustrating processing conducted by the refocusing processing unit 114. The processing conducted by the refocusing processing unit 114 is described with reference to FIG. 6 and FIG. 7.

When the user inputs a designation of the normal reproduction or the search reproduction to the operation unit 120, the controller 119 transmits a signal indicating the reproduction mode, such as a normal reproduction operation signal or a search reproduction operation signal, to the depth-of-field setting unit 601. In Step S701, the depth-of-field setting unit 601 receives the signal indicating one of those reproduction modes. In Step S702, the depth-of-field setting unit 601 determines the reproduction mode based on the received signal, and determines an integration range of the coordinates (u,v) on the main lens plane 501, which is used as a coefficient for Expression (2), depending on the reproduction mode.

Narrowing the integration range of the coordinates (u,v) on the main lens plane 501 corresponds to decreasing a lens aperture diameter (closing a lens diaphragm). In contrast, widening the integration range of the coordinates (u,v) on the main lens plane 501 corresponds to increasing the lens aperture diameter (opening the lens diaphragm). This can change the depth of field of the refocused image.

When the operation signal input from the controller 119 is the normal reproduction operation signal, the integration range of the coordinates (u,v) on the main lens plane 501 is set as an entirety of the main lens plane 501 (the procedure advances to Step S703). When the operation signal input from the controller 119 is the search reproduction operation signal, the integration range of the coordinates (u,v) on the main lens plane 501 is narrowed based on a speed multiplication factor of the search reproduction (the procedure advances to Step S704). In other words, the integration range of the coordinates (u,v) on the main lens plane 501 is set to be narrower in a case of the search reproduction than in a case of the normal reproduction. The depth-of-field setting unit 601 transmits the integration range set in this manner to the refocused-image generating unit 602.

The refocused-image generating unit 602 calculates the refocused image in accordance with Expression (2) by using the LF data read from the LF data area of the memory 116 and the integration range of the coordinates (u,v) on the main lens plane 501 received from the depth-of-field setting unit 601. When the integration range is the entirety of the main lens plane 501, in Step S703, the refocused-image generating unit 602 generates the refocused image having a small depth of field. When the integration range is set to be narrow, in Step S704, the refocused-image generating unit 602 generates the refocused image having a large depth of field.

The refocused-image generating unit 602 stores the generated refocused image into the frame image data area of the memory 116 (Step S705). The video output unit 109 reads this image from the memory 116, generates the moving image, and displays the moving image on the display panel 110.

The refocusing coefficient α becomes a different value depending on a position to be in focus within the image. For example, at the first time of the refocusing processing, the refocusing coefficient α may be set so that a center position of the image becomes an in-focus position. At the second and subsequent times of the refocusing processing, the refocusing coefficient α may be set in a portion selected by the user, to create the refocused image in accordance with Expression (2).

As described above, the image processing apparatus 100 according to this embodiment creates and displays the image having a small depth of field at the time of normal reproduction, and at the time of search reproduction, creates and displays the image having a large depth of field. This allows the moving image reproduced in the search reproduction to be improved in visibility, which facilitates selection of a desired scene made by the user.

In the above description, the refocused image having a large depth of field to be displayed in the search reproduction is generated after receiving an input of the signal indicating the search reproduction (that is, at the time of search reproduction), but the image may be generated before the search reproduction. In other words, the image may be generated during any period before reproduction such as between photographing and recording or between recording and reproduction. In this case, the refocused image having a large depth of field, which is created in advance, is recorded onto the recording medium 118 through the media I/F 117. At the time of search reproduction, in Step S704 and Step S705 of FIG. 7, the refocused image having a large depth of field is read from the recording medium 118 into the memory 116 without being newly generated.

(Second Embodiment)

An image processing apparatus according to a second embodiment of the present invention is described. A configuration of the image processing apparatus according to this embodiment is the same as the configuration of the image processing apparatus according to the first embodiment illustrated in FIG. 1 except for the configuration and processing of a refocusing processing unit, and hence a description thereof is omitted. Now, the configuration of the refocusing processing unit according to this embodiment is described in detail.

Figure 8:
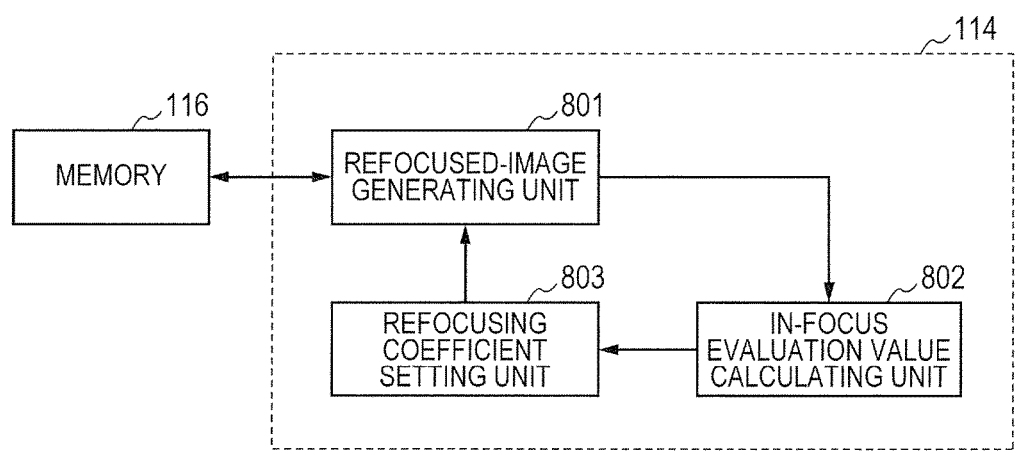
FIG. 8 is a block diagram for illustrating a further detailed configuration of a refocusing processing unit according to a second embodiment of the present invention.

FIG. 8 is a block diagram for illustrating a further detailed configuration of the refocusing processing unit. The refocusing processing unit 114 according to the second embodiment includes a refocused-image generating unit 801, an in-focus evaluation value calculating unit 802, and a refocusing coefficient setting unit 803.

When the normal reproduction is conducted, the refocused image is generated by the refocused-image generating unit 801 in the same manner as in the first embodiment. As an example, when the user specifies a position of an image by using the operation unit 120, the refocusing coefficient $\alpha$ is set from the coordinates (x',y') on the refocusing plane 502 of the position. The refocusing coefficient $\alpha$ is applied to Expression (2), to thereby generate the refocused image. In this case, the integration range of the coordinates (u,v) on the main lens plane 501 within Expression (2) is set as the entirety of the main lens plane 501.

When the search reproduction is conducted, the refocused image divided into predetermined blocks is generated by the refocused-image generating unit 801, the in-focus evaluation value calculating unit 802, and the refocusing coefficient setting unit 803 illustrated in FIG. 8. The predetermined blocks are obtained by dividing the pixels of the entire screen obtained after the generation of the refocused image in terms of a predetermined shape and a predetermined size. For example, when the screen is divided into eight in terms of the row direction and the column direction, 8×8=64 blocks are obtained. The refocused image is generated for each of the blocks. A plurality of the refocused images are generated for each block using a plurality of refocusing coefficients. After that, an in-focus evaluation value indicating a degree to which each of the generated images is in focus is calculated, to select the refocused image having the largest in-focus evaluation value. This allows the image that is most in focus to be selected for each block.

The above-mentioned processing is conducted for all the blocks, to thereby allow the image processing apparatus according to this embodiment to obtain the refocused images that are in focus on a block-by-block basis (that is, images having the focus positions optimized in different positions for the respective blocks). Those blocks are combined, to thereby allow the image processing apparatus according to this embodiment to obtain the image that is in focus in the entire screen. In other words, the image processing apparatus according to this embodiment may obtain the image having a large depth of field. Note that, unlike in the first embodiment, in this embodiment, even when the integration range of the coordinates (u,v) on the main lens plane 501 within Expression (2) is set as the entirety of a main lens plane in the search reproduction, the image processing apparatus according to this embodiment may obtain the image having a large depth of field.

Figure 9:
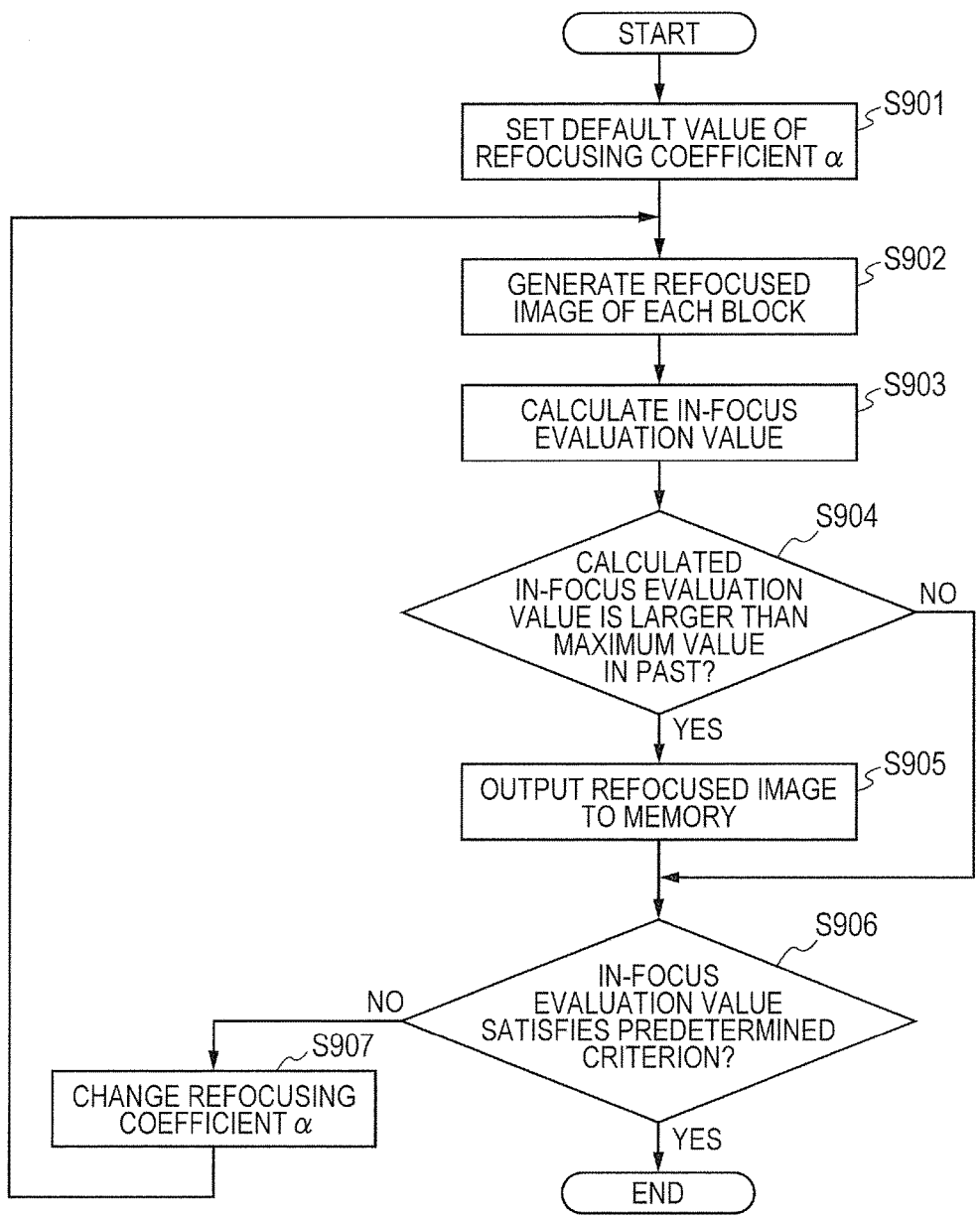
FIG. 9 is a flowchart for illustrating processing conducted by the refocusing processing unit according to the second embodiment.

FIG. 9 is a flowchart for illustrating processing for generating an image for search reproduction conducted by the refocusing processing unit 114. The processing conducted by the refocusing processing unit 114 is described with reference to FIG. 8 and FIG. 9.

In Step S901, the refocusing coefficient setting unit 803 sets the refocusing coefficient $\alpha$ to a default value. In Step S902, the refocused-image generating unit 801 uses the refocusing coefficient $\alpha$ to generate the refocused image of each block. The refocusing coefficient $\alpha$ used in Step S902 is the default value set in Step S901 at the first time, and a value set in Step S907 described later at the second and subsequent times. In Step S903, the in-focus evaluation value calculating unit 802 calculates the in-focus evaluation value of each block from the refocused image of each block generated in Step S902.

In Step S904, the refocusing processing unit 114 determines whether or not the in-focus evaluation value within each block obtained in Step S903 is larger than a maximum value of the in-focus evaluation value of the refocused image generated by using a different refocusing coefficient $\alpha$ in the past. When there is a block having the in-focus evaluation value determined to be larger than the maximum value (i.e., Yes in Step S904), the procedure advances to Step S905. When there is no block having the in-focus evaluation value determined to be larger than the maximum value (i.e., No in Step S904), the procedure advances to Step S906.

In Step S905, the refocusing processing unit 114 outputs the refocused image of the block having the in-focus evaluation value determined to be larger than the maximum value in the past in Step S904, to the memory 116.

In Step S906, the refocusing processing unit 114 determines whether or not the in-focus evaluation value of the refocused image of each block obtained so far satisfies a predetermined criterion. When the in-focus evaluation value satisfies the predetermined criterion (i.e., Yes in Step S906), the processing for generating the image for search reproduction is brought to an end. When the in-focus evaluation value does not satisfy the predetermined criterion (i.e., No in Step S906), the refocusing processing is insufficient, and hence, the procedure advances to Step S907.

In Step S907, the refocusing processing unit 114 changes the refocusing coefficient $\alpha$ of each block, and then the procedure advances to Step S902. The changed refocusing coefficient may be determined so as to, for example, increase or decrease from the previous value by a predetermined value. Further, the changed value may be determined with reference to a past relationship between the refocusing coefficient $\alpha$ and the in-focus evaluation value. The looping from Step S902 to Step S907 allows the in-focus evaluation value of each block to be improved.

The processing for generating the image for search reproduction conducted by the refocusing processing unit 114 may be conducted at any timing after photographing and before reproduction. For example, the processing may be conducted at a timing such as immediately after photographing or at power on of the image processing apparatus 100. Further, the processing may be conducted in a background of the photographing processing. Further, the image for search reproduction may be generated for the images of all the frames, or may be generated for every predetermined number of frame images to thereby skip a part of the frames.

Figure 10:
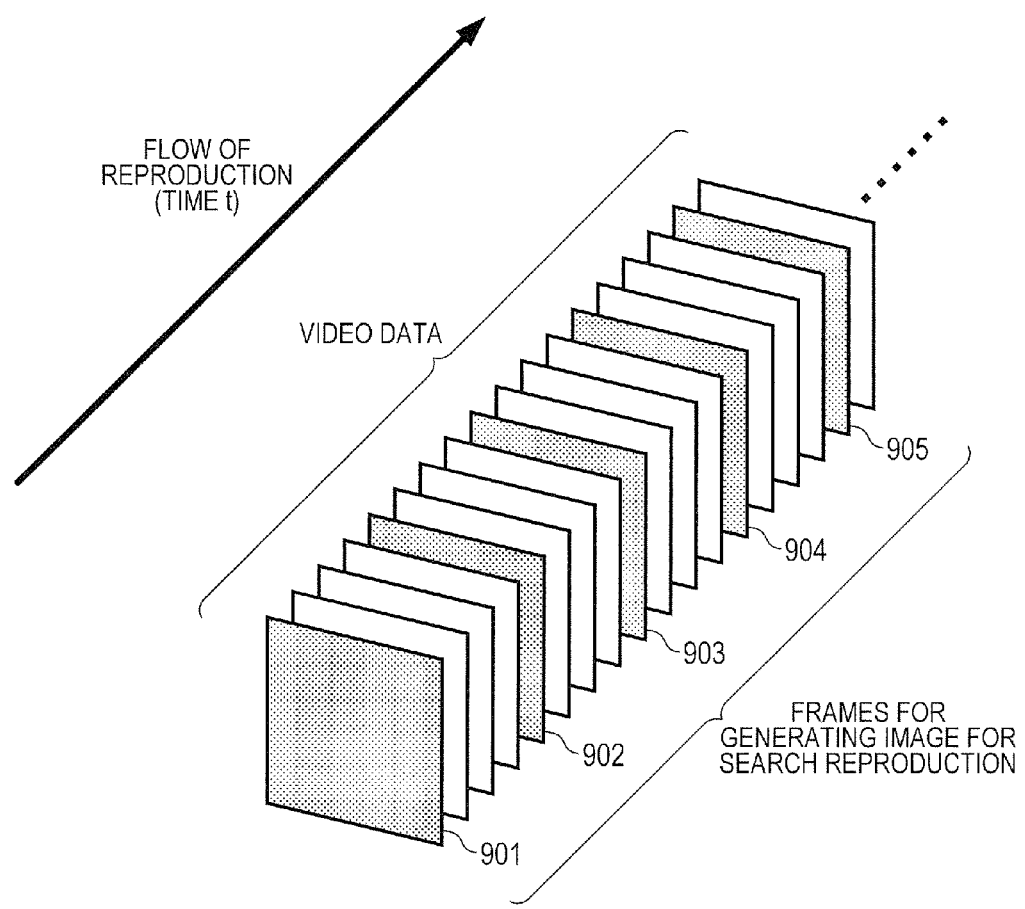
FIG. 10 is a diagram for illustrating a frame structure exhibited when an image for search reproduction is created for every four frames.

FIG. 10 is a diagram for illustrating a frame structure exhibited when the image for search reproduction is created for every four frames. Of the obtained video data, the image for search reproduction is generated for frames 901 to 905 for generating the image for search reproduction, which are arranged for every four frames. When the created images for search reproduction are reproduced at the same processing speed as they are, the search reproduction is conducted at a four-times speed.

A method of switching between the refocused image for normal reproduction and the image for search reproduction depending on the reproduction mode when the media I/F 117 reads the image from the recording medium 118 is described. The refocused image created by the refocusing processing unit 114 is recorded onto the recording medium 118 after having a time code added as header information. When the reproduction mode is switched from the normal reproduction to the search reproduction, the media I/F 117 selects the image for search reproduction to which the same value as the value of the time code added to a header of the refocused image for normal reproduction is added, from the recording medium 118, and outputs the image for search reproduction. Further, when the reproduction mode is switched from the search reproduction to the normal reproduction, the media I/F 117 selects the refocused image for normal reproduction to which the time code having the same value as the value of the time code added to a header of the image for search reproduction is added, from the recording medium 118, and outputs the refocused image for normal reproduction. This allows the switching between the refocused image for normal reproduction and the image for search reproduction.

In the first embodiment, the method of narrowing the integration range of the coordinates (u,v) on the main lens plane 501 within Expression (2) is used when the image having a large depth of field is generated. This is equivalent to a reduction in amount of light entered into the lens. Therefore, an ISO sensitivity needs to be increased with a photographed scene low in illuminance, which may increase noise in the image for search reproduction (i.e., degrade an S/N ratio). In contrast, in the second embodiment, a plurality of images having different focus positions are combined, to thereby generate the image having a large depth of field without narrowing the integration range. Accordingly, the above-mentioned factor that may cause noise is unlikely to occur, which allows the image for search reproduction having satisfactory image quality to be obtained even with the photographed scene low in illuminance.

In addition, in this embodiment, in the same manner as in the first embodiment, the image processing apparatus according to this embodiment may create and display the image having a large depth of field at the time of search reproduction. This allows the moving image reproduced in the search reproduction to be improved in visibility, which facilitates the selection of a desired scene made by the user.

(Third Embodiment)

An image processing apparatus according to a third embodiment of the present invention is described. This embodiment is different from the first embodiment in that a search image processing unit 122 is added to the image processing apparatus, and the other configurations are approximately the same. Therefore, descriptions of the same parts are omitted.

Figure 11:
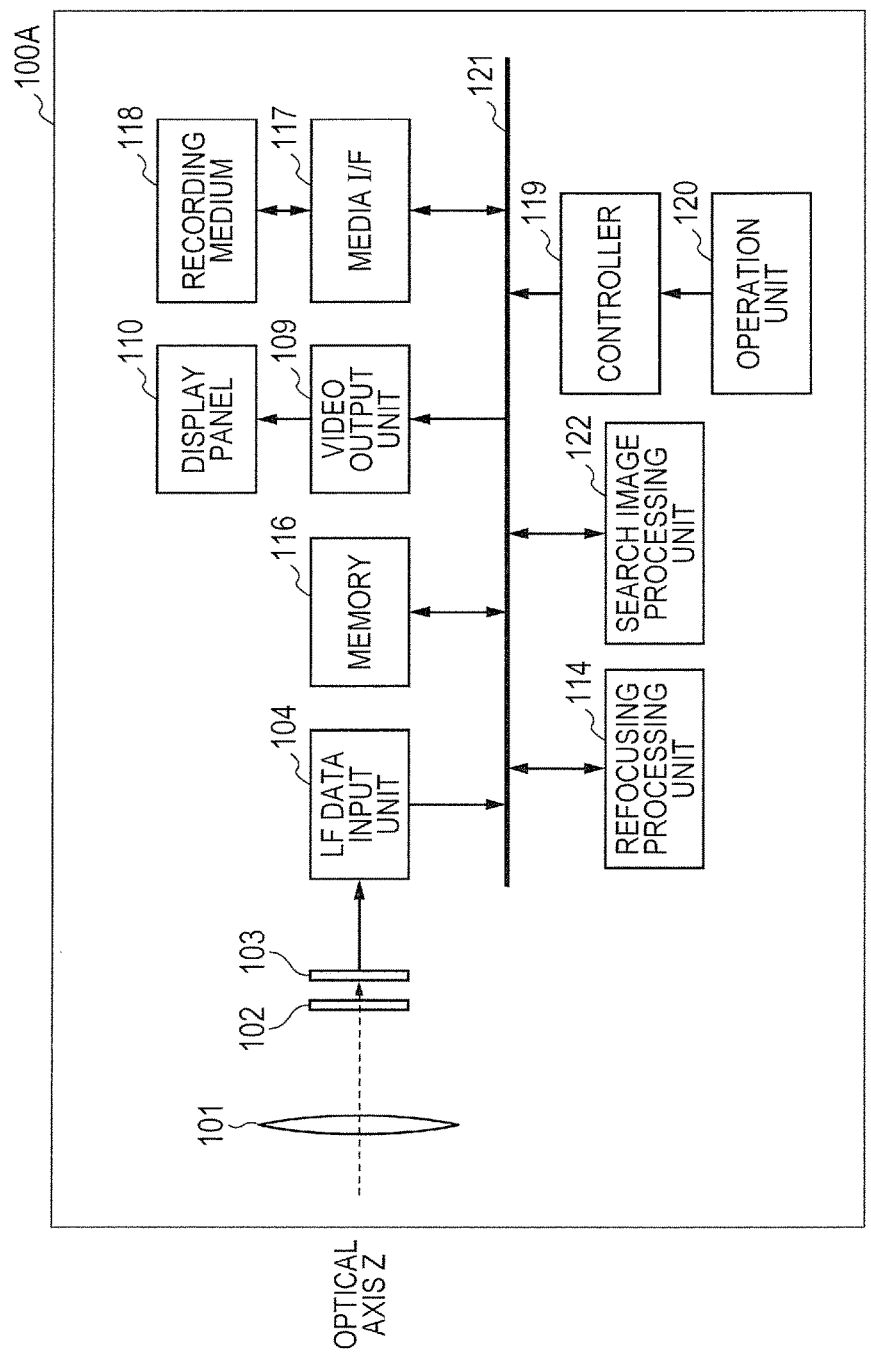
FIG. 11 is a block diagram for illustrating a configuration of an image processing apparatus according to a third embodiment of the present invention.

FIG. 11 is a block diagram for illustrating a configuration of the image processing apparatus according to the third embodiment of the present invention. An image processing apparatus 100A includes the main lens 101, the microlens array 102, the image pickup element 103, the LF data input unit 104, the video output unit 109, the display panel 110, and the refocusing processing unit 114. Further, the image processing apparatus 100A includes the memory 116, the media I/F 117, the recording medium 118, the controller 119, the operation unit 120, the memory bus 121, and the search image processing unit 122.

When the operation mode of the image processing apparatus 100 is a high speed reproduction mode, the search image processing unit 122 serving as the frame image generating unit reads data corresponding to pixels within a predetermined region from the LF data stored in the LF data area of the memory 116, to generate a frame image. The video data generated in search reproduction processing is stored in the video signal area of the memory 116.

Note that, in this embodiment and a fourth embodiment described later, the integration range of the coordinates (u,v) on the main lens plane 501, which is an integration coefficient for Expression (2), is set as, for example, the entirety of the main lens plane 501. In this embodiment and the fourth embodiment described later, the refocusing processing unit 114 may have a function different from that of the first embodiment and the second embodiment. Specifically, the refocusing processing unit 114 uses the LF data read from the LF data area of the memory 116, and receives the integration range of the coordinates (u,v) on the main lens plane 501 set in advance, to compute the refocused image in accordance with Expression (2). At the first time of refocusing processing, the refocusing coefficient $\alpha$ is set so that, for example, the center position of the image becomes the in-focus position. At the second and subsequent times of the refocusing processing, the refocusing coefficient $\alpha$ is set in the portion selected by the user, to compute the refocused image in accordance with Expression (2).

Figure 12:
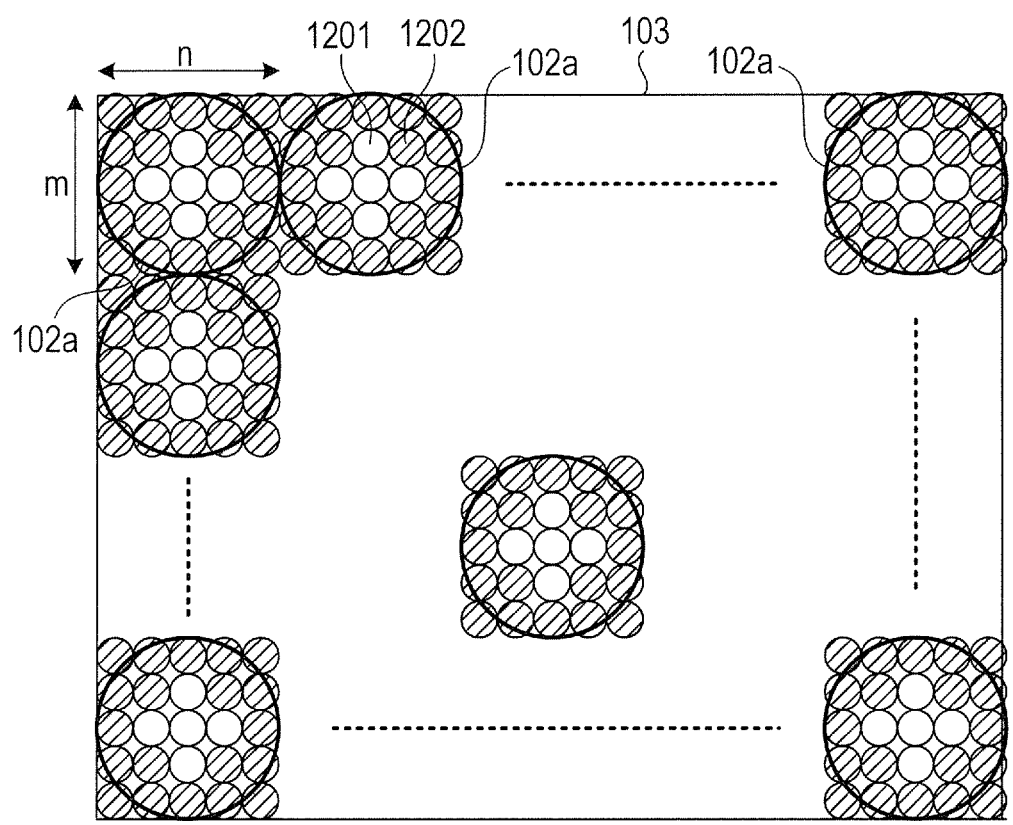
FIG. 12 is a diagram for illustrating a read region of LF data exhibited at a time of search reproduction.

Next, the signal processing conducted at the time of search reproduction is described. FIG. 12 is a diagram for illustrating a read region of the LF data exhibited at the time of search reproduction. The controller 119 reads a part of data corresponding to one frame of the LF data stored on the recording medium 118 through the media I/F 117, and stores the part of data into the LF data area within the memory 116. A region of the LF data to be read may be only the LF data corresponding to the pixels within a central part of each microlens 102a.

As illustrated in, for example, FIG. 12, the controller 119 reads the LF data corresponding to pixels 1201 indicated by circles that are not hatched, and does not read the LF data corresponding to pixels 1202 indicated by hatched circles. As illustrated in FIG. 12, the controller 119 reads data on 5 pixels existing in the central part of 25 (5×5) pixels that form the unit pixel arranged for one microlens 102a, and creates the frame image having a large depth of field. A plurality of pixels existing in the central part within the unit pixel arranged for each microlens 102a exhibit a more satisfactory focus state of the light beam passing through the optical axis of the microlens 102a than pixels corresponding to a peripheral edge portion of the microlens 102a. The controller 119 restricts the reading of the data on the pixels corresponding to the peripheral edge portion of the microlens 102a, and reads the data on the pixels existing in the central part of the unit pixel corresponding to the optical axis of the microlens 102a. The search image processing unit 122 generates the frame image having a large depth of field based on the read data on the pixels. The reading of the data on the pixels existing in the central part of the unit pixel is equivalent to, for example, reducing a lens aperture diameter (closing the lens diaphragm). The search image processing unit 122 stores the generated frame image data into the frame image data area of the memory 116.

After the frame image data corresponding to the number of frames that can be processed as the moving image data is stored in the frame image data area of the memory 116, the video output unit 109 reads the frame image data from the frame image data area of the memory 116, and conducts moving image processing therefor, to generate the moving image signal. The generated moving image signal is output to the display panel 110, and the video of the moving image is displayed on the display panel 110.

Figure 13:
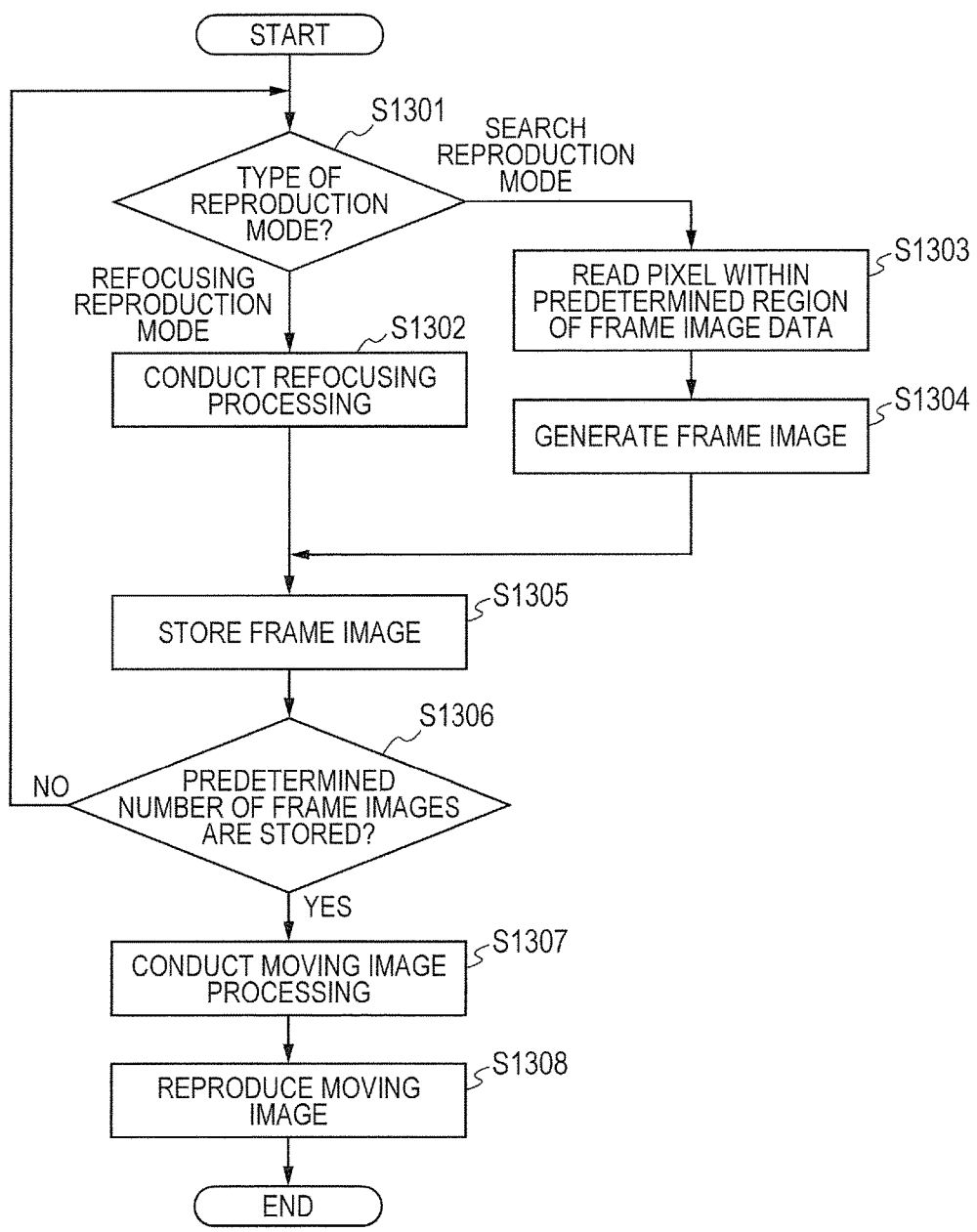
FIG. 13 is a flowchart for illustrating image processing according to the third embodiment.
Figure 14:
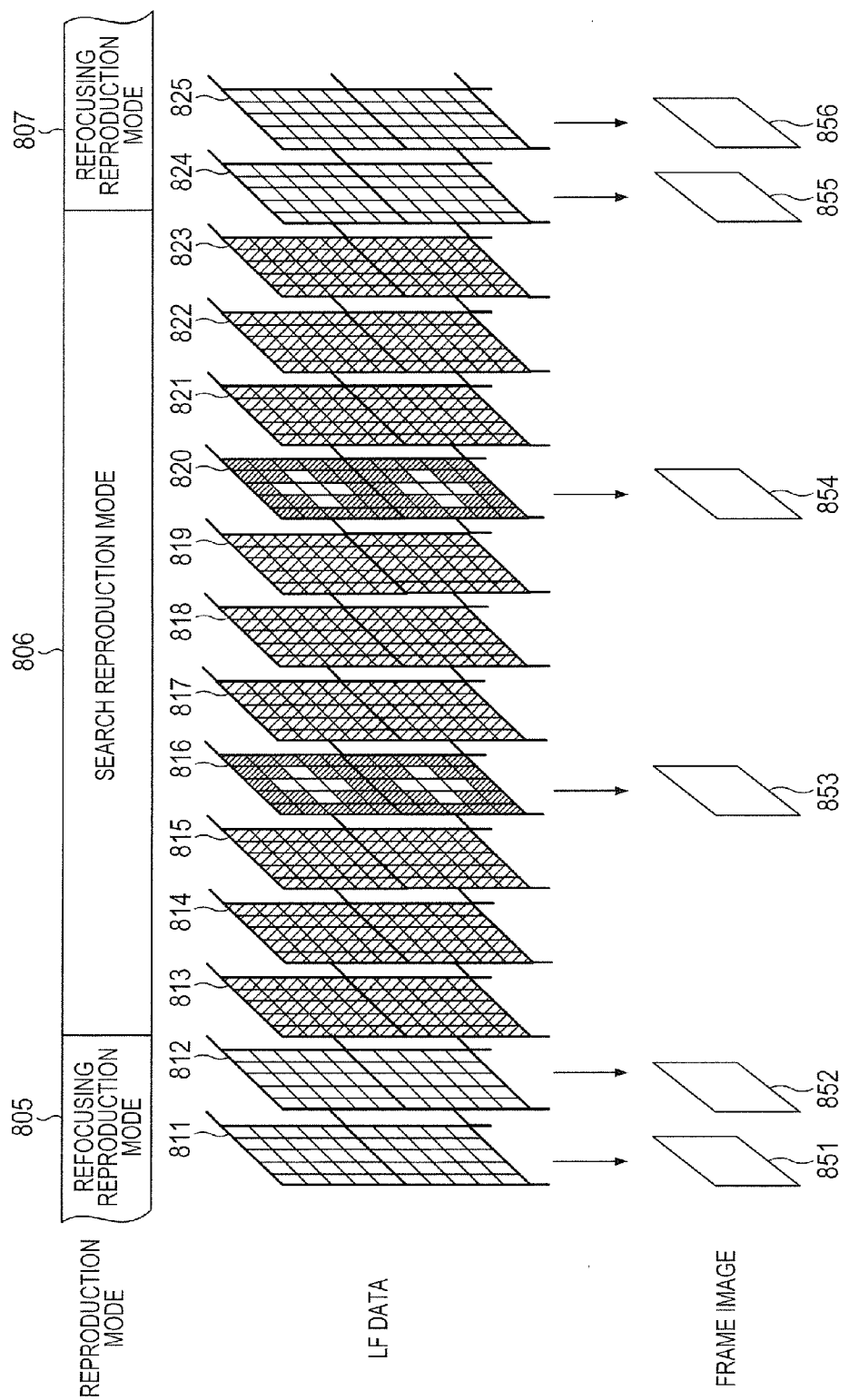
FIG. 14 is a diagram for illustrating how frame images are generated in a refocusing reproduction mode and a search reproduction mode.

Next, the frame images generated in the refocusing reproduction mode and the search reproduction mode are described. FIG. 13 is a flowchart for illustrating image processing according to this embodiment, and FIG. 14 is a diagram for illustrating how frame images are generated in the refocusing reproduction mode and the search reproduction mode. The flowchart illustrated in FIG. 13 is executed when the operation unit 120 is operated by the user. FIG. 14 is an illustration of a case where the operation mode makes a transition from a refocusing reproduction mode 805 to a search reproduction mode 806 at four-times speed, followed by a transition made to a refocusing reproduction mode 807. In FIG. 14, the pixel images of the image pickup element 103 are illustrated only in the regions corresponding to two microlenses as an example, but it should be understood that the pixel images may be applied to the entire image pickup element 103. Further, pieces of LF data 811 to 825 illustrated in FIG. 14 are the LF data stored on the recording medium 118. Note that, the processing illustrated in FIG. 13 keeps being conducted until the reproduction of the moving image is stopped by the user's operation.

In Step S1301, the controller 119 determines the type of reproduction mode for reproducing the moving image selected by the user. When the reproduction mode is the refocusing reproduction mode (Step S1301: refocusing reproduction mode), the controller 119 determines that the refocusing reproduction is to be conducted, and the procedure advances to Step S1302.

In Step S1302, the refocusing processing unit 114 reads the LF data, and conducts the refocusing processing. Specifically, the controller 119 reads the data on all the pixels as the read region from the LF data stored on the recording medium 118 through the media I/F 117, and stores the data into the LF data area of the memory 116. The refocusing processing unit 114 reads the LF data stored in the LF data area of the memory 116, and computes the frame image that is the refocused image in accordance with Expression (2).

As illustrated in FIG. 14, in the refocusing reproduction mode 805, the refocusing processing unit 114 conducts the refocusing processing for all the pixels of the piece of LF data 811, to generate a frame image 851. In the same manner, the refocusing processing unit 114 uses the next piece of LF data 812 to conduct the refocusing processing, to generate a frame image 852. This allows the frame image having a large depth of field to be obtained. Note that, in the illustration of FIG. 14, the read region to be read by the controller 119 is not hatched, and the pixel region that is not to be read by the controller 119 is hatched.

On the other hand, in Step S1301, when the reproduction mode is the search reproduction mode (Step S1301: search reproduction mode), the controller 119 determines that the search reproduction is to be conducted, and the procedure advances to Step S1303.

In Step S1303, the controller 119 reads the data on the pixels within a predetermined region of the LF data. Specifically, the controller 119 reads data within a predetermined region of each unit pixel for every predetermined number of frames from the LF data stored in the recording medium 118. The controller 119 skips reading of the LF data included in a predetermined number of frames along a time axis, reads data within a predetermined pixel region of the unit pixel as the read region from the LF data corresponding to, for example, the last one frame, and stores the data into the LF data area within the memory 116. The read region read by the controller 119 is a pixel region corresponding to the central part of the microlens 102a.

In Step S1304, the search image processing unit 122 generates the frame image from the LF data stored in the LF data area of the memory 116. The search image processing unit 122 reads the data on the pixels of the LF data stored in the memory 116 in Step S1303, and generates the frame image having a large depth of field. The number of frames of the frame images generated by the controller 119 is the number of frames corresponding to the reproduction speed set for the search reproduction mode.

As illustrated in FIG. 14, for example, when the moving image is subjected to the search reproduction at four-times speed in the search reproduction mode 806, the controller 119 does not read the LF data corresponding to three frames of the pieces of LF data 813 to 815 among the pieces of LF data 813 to 816 corresponding to four image pickup frames. Then, the controller 119 reads the piece of LF data 816 on the fourth frame. At this time, the controller 119 reads data corresponding to five pixels existing in the central part of the piece of LF data 816 as the read region from the 25 (5×5) pixels forming the unit pixel. In each unit pixel, the read region to be read by the controller 119 is the same region. The search image processing unit 122 reads the data on the pixels from the piece of LF data 816 in Step S1303, and generates a frame image 853 having a large depth of field. The search image processing unit 122 reads data on five pixels within the central part of the microlens 102a exhibiting a satisfactory focus state, and adds the images of the respective pixels, to thereby allow the generation of the frame image having a large depth of field 853.

The controller 119 conducts the same operation during the period of the search reproduction mode 806, that is, the controller 119 does not read the pieces of LF data 817 to 819 corresponding to the image pickup frames in a time axis direction, and reads the data on five pixels in the central part of the microlens 102a from the piece of LF data 820. The search image processing unit 122 generates a frame image 854 having a large depth of field from the data on the pixels read from the piece of LF data 820. Therefore, in the search reproduction mode 806, the search image processing unit 122 skips the LF data corresponding to a predetermined number of frame images, to thereby shorten a processing time for generating the frame image compared to the refocusing reproduction mode 805, which allows the moving image reproduction to be conducted smoothly.

In Step S1305, the refocusing processing unit 114 or the search image processing unit 122 stores the generated frame image data into a frame image area within the memory 116. In the subsequent Step S1306, the controller 119 determines whether or not the frame image data corresponding to a predetermined number of frame images is stored in the frame image area within the memory 116. When the frame image data corresponding to a predetermined number of frame images is stored (Step S1306: Yes), the controller 119 determines that the frame image data corresponding to the number of frame images required for the moving image processing is stored, and the procedure advances to Step S1307. On the other hand, the number of pieces of frame image data stored in the frame image data area is less than the predetermined number of frame images (Step S1306: No), the controller 119 determines that the frame image data corresponding to the number of frame images required for the moving image processing is not stored yet, and the procedure returns to Step S1301.

In Step S1307, the video output unit 109 reads the frame image data from the frame image data area of the memory 116, and conducts the moving image processing, to generate the moving image signal. In the subsequent Step S1308, the video output unit 109 outputs the generated moving image signal to the display panel 110. The video of the generated moving image is displayed on the display panel 110.

In this manner, at the time of search reproduction, the frame image is generated based on the pixels corresponding to the central part of the microlens 102a exhibiting a satisfactory focus state, to thereby display the moving image having a large depth of field, which allows the user to obtain the image excellent in visibility even at the time of search reproduction.

(Fourth Embodiment)

An image processing apparatus according to a fourth embodiment of the present invention is described. This embodiment is different from the third embodiment in that a frame pixel adding unit 1501 is added to the image processing apparatus, and the other configurations are the same. Therefore, descriptions of the same parts are omitted.

Figure 15:
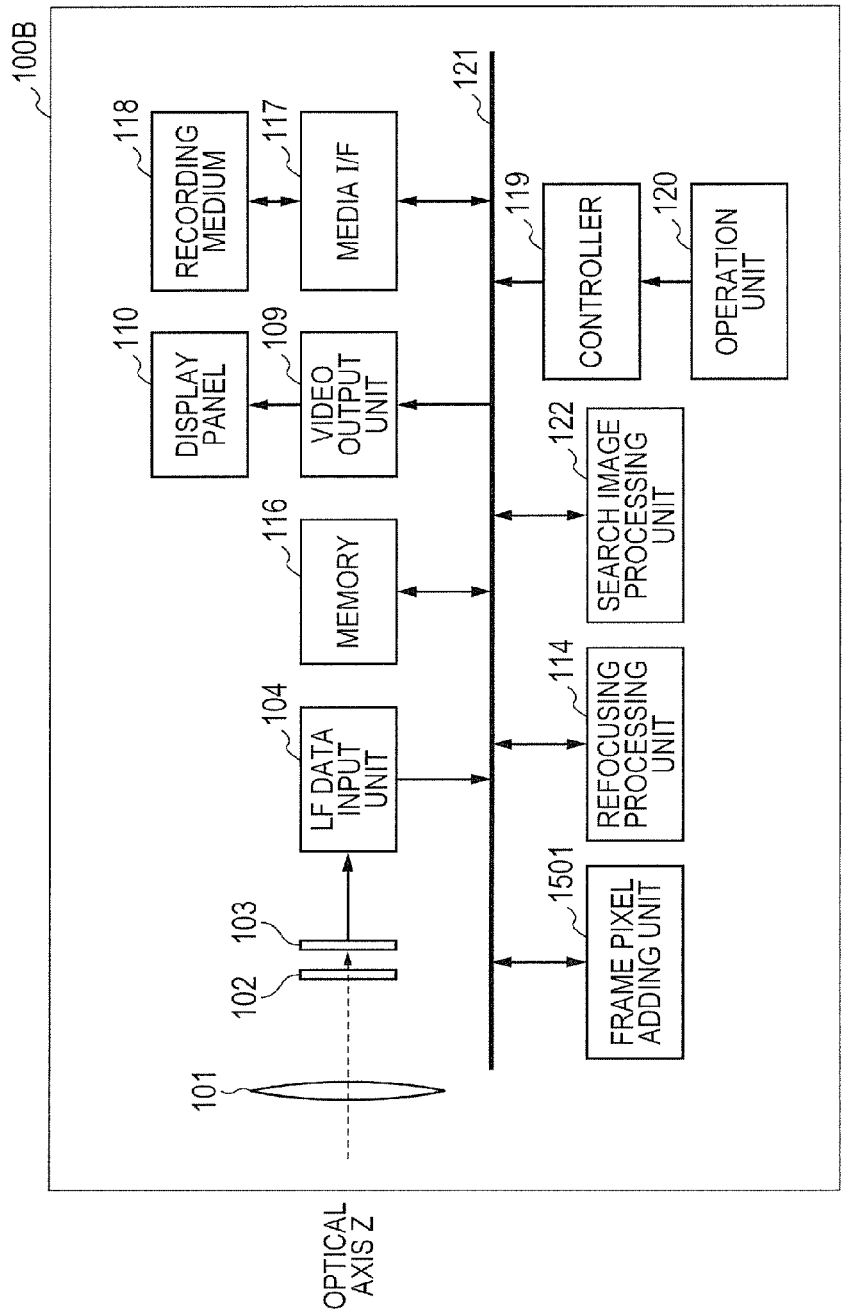
FIG. 15 is a block diagram for illustrating a configuration of an image processing apparatus according to a fourth embodiment of the present invention.

FIG. 15 is a block diagram for illustrating a configuration of the image processing apparatus according to the fourth embodiment of the present invention. An image processing apparatus 100B includes the main lens 101, the microlens array 102, the image pickup element 103, the LF data input unit 104, the video output unit 109, the display panel 110, and the refocusing processing unit 114. Further, the image processing apparatus 100B includes the memory 116, the media I/F 117, the recording medium 118, the controller 119, the operation unit 120, the memory bus 121, the search image processing unit 122, and the frame pixel adding unit 1501.

In the search reproduction mode, the frame pixel adding unit 1501 generates a new piece of frame image data by adding serial pieces of frame image data stored in the frame image data area of the memory 116.

Figure 16:
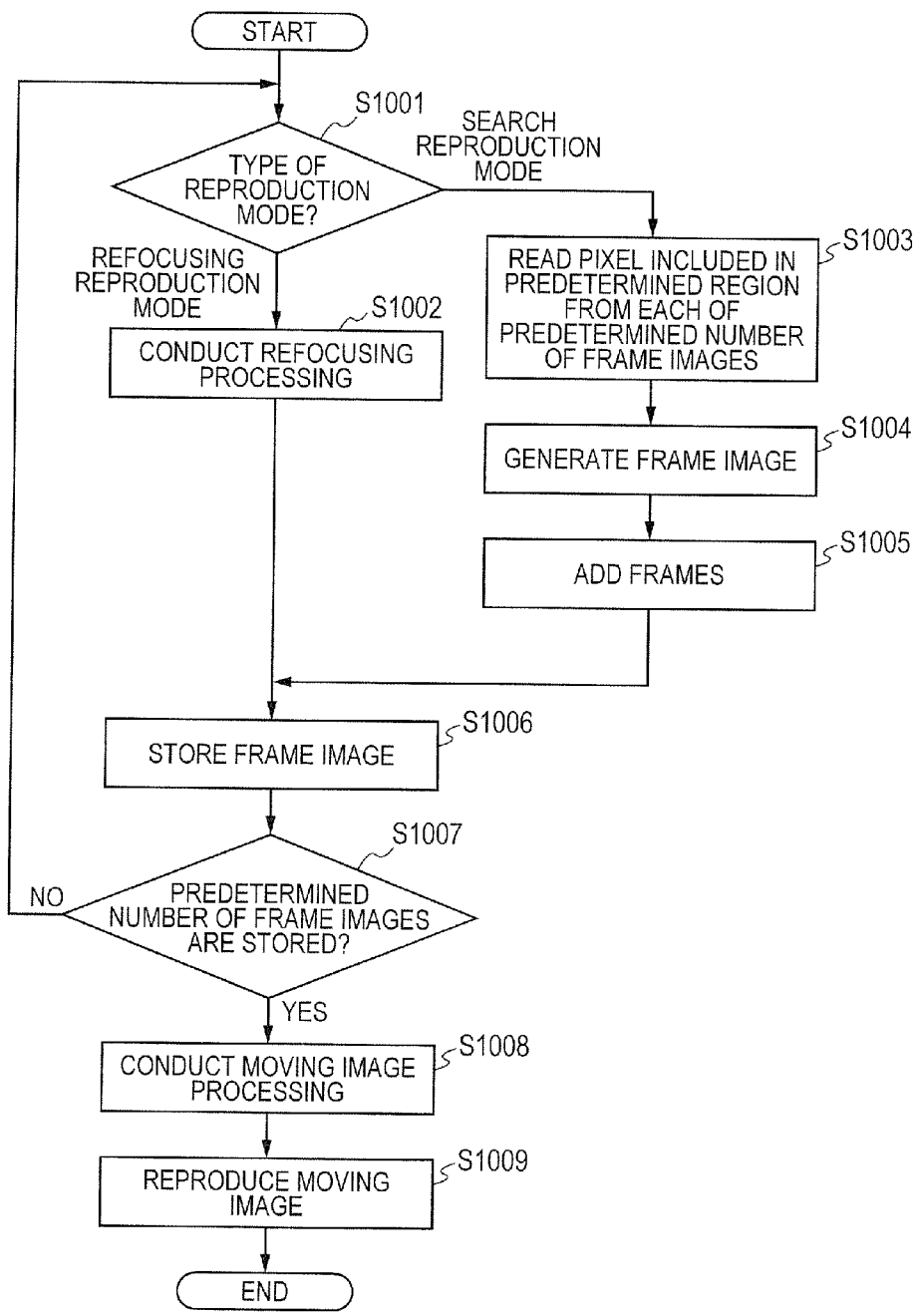
FIG. 16 is a flowchart for illustrating image processing according to the fourth embodiment.
Figure 17:
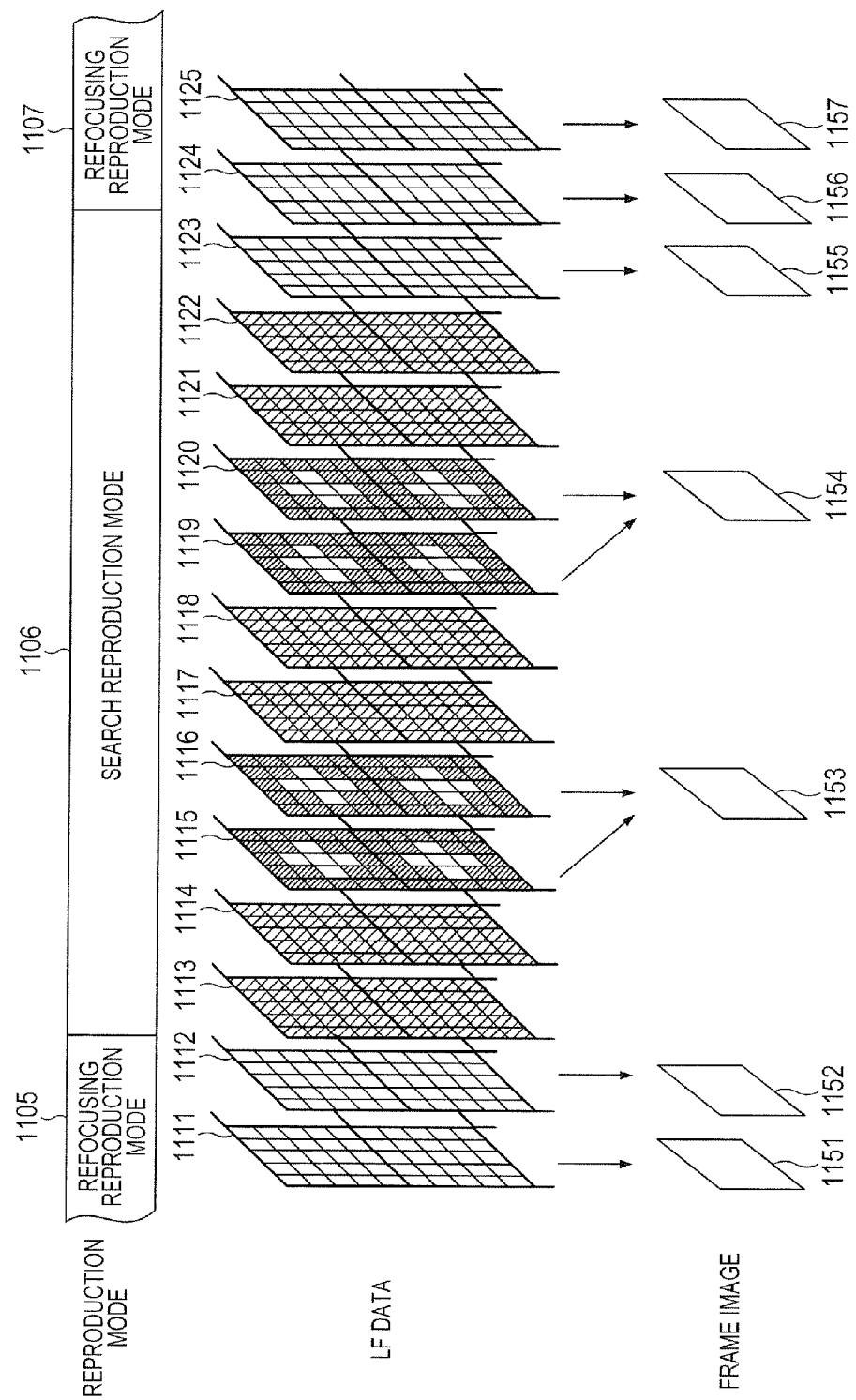
FIG. 17 is a diagram for illustrating how frames of the LF data are added at the time of search reproduction.

Next, the frame images generated in the refocusing reproduction mode and the search reproduction mode are described. FIG. 16 is a flowchart for illustrating image processing according to this embodiment, and FIG. 17 is a diagram for illustrating how frame images are generated in the refocusing reproduction mode and the search reproduction mode. The flowchart illustrated in FIG. 16 is executed when the operation unit 120 is operated by the user. FIG. 17 is an illustration of a case where the reproduction mode for the moving image makes a transition from a refocusing reproduction mode 1105 to a search reproduction mode 1106 at four-times speed, followed by a transition made to a refocusing reproduction mode 1107. In FIG. 17, the pixel images of the image pickup element 103 are illustrated only in the regions corresponding to two microlenses as an example, but it should be understood that the pixel images may be applied to the entire image pickup element 103. Further, pieces of LF data 1111 to 1125 illustrated in FIG. 17 are the LF data stored on the recording medium 118.

In Step S1001, the controller 119 determines the type of reproduction mode for reproducing the moving image selected by the user. When the reproduction mode is the refocusing reproduction mode (Step S1001: refocusing reproduction mode), the controller 119 determines that the normal reproduction is to be conducted, and the procedure advances to Step S1002.

In Step S1002, the refocusing processing unit 114 reads the LF data, and conducts the refocusing processing. Specifically, the controller 119 reads the data on all the pixels of the LF data as the read region from the LF data stored on the recording medium 118 through the media I/F 117, and stores the data into the LF data area of the memory 116. The refocusing processing unit 114 reads the LF data stored in the LF data area of the memory 116, and computes the frame image that is the refocused image in accordance with Expression (2). As illustrated in FIG. 17, the refocusing processing unit 114 reads the piece of LF data 1111 stored in the LF data area of the memory 116, and generates a frame image 1151 that is the refocused image. In the same manner, the controller 119 reads the data on all the pixels of the piece of LF data 1112, and the refocusing processing unit 114 generates a frame image 1152 based on the read data. Note that, in the illustration of FIG. 17, the read region to be read by the controller 119 and transferred to the memory 116 is not hatched, and the pixel region that is not to be read by the controller 119 is hatched.

On the other hand, in Step S1001, when the reproduction mode is the search reproduction mode (Step S1001: search reproduction mode), the controller 119 determines that the high speed reproduction is to be conducted, and the procedure advances to Step S1003.

In Step S1003, the controller 119 reads data corresponding to a predetermined region of the unit pixel as the read region from the LF data corresponding to each of the predetermined number of frame images. Specifically, the controller 119 reads the data within the predetermined pixel region of each unit pixel for every predetermined number of frames from the LF data stored in the recording medium 118. The controller 119 skips the reading of the LF data included in a predetermined number of frames along the time axis, reads the data within the predetermined pixel region from the LF data on at least two frames adjacent to each other in the time axis, and stores the data into the LF data area within the memory 116. The predetermined pixel region corresponds to the central part of the microlens 102a.

In Step S1004, the search image processing unit 122 generates the frame image from the data within the pixel region read in Step S1003. Specifically, for each of the read frames, the search image processing unit 122 generates the frame image having a large depth of field from the data on the pixels included in the read region read from the LF data area. The search image processing unit 122 generates the frame image corresponding to the number of read frames.

In Step S1005, the frame pixel adding unit 1501 generates one frame image by simply adding a plurality of pieces of frame image data generated in Step S1004. Image pickup times of the plurality of serial pieces of LF data read in Step S1003 are temporally proximate to one another. The plurality of pieces of frame image data generated from the plurality of pieces of LF data are simply added, to thereby reduce random noise included in the LF data. This allows improvement of an S/N ratio that decreases as the number of frames by which the LF data is to be read is decreased in the search reproduction mode 1106.

As illustrated in FIG. 17, for example, when the moving image is reproduced at four-times speed in the search reproduction mode 906, the controller 119 does not read the pieces of LF data 1113 and 1114 adjacent to each other in time series. The controller 119 creates one frame image for every four image pickup frames. For example, with regard to the pieces of LF data 1113 to 1116, the controller 119 reads the pieces of LF data 1115 and 1116 without reading the pieces of LF data 1113 and 1114 from the recording medium 118. In that case, only five pixels existing in the central part of the pieces of LF data 1115 and 1116 are read among the 25 (5×5) pixels that are pixels forming the microlens 102a. The search image processing unit 122 generates each frame image having a large depth of field from the read five pixels. The pieces of LF data 1115 and 1116 are serial pieces of data, and have the image pickup times more temporally proximate to each other than, for example, the pieces of LF data 1113 and 1114. Therefore, the frame pixel adding unit 1501 simply adds the two pieces of frame image data to generate a frame image 1153. The same processing is conducted during the period of the search reproduction mode 1106, and the frame pixel adding unit 1501 generates a frame image 1154 from the pieces of LF data 1117 to 1120.

In Step S1006, the refocusing processing unit 114 or the frame pixel adding unit 1501 stores the generated frame image data into a frame image area within the memory 116. In the subsequent Step S1007, the controller 119 determines whether or not the frame image data corresponding to a predetermined number of frame images is stored in the frame image area within the memory 116. When the frame image data corresponding to a predetermined number of frame images is stored (Step S1007: Yes), the controller 119 determines that the frame image data corresponding to the number of frame images required for the moving image processing is stored, and the procedure advances to Step S1008. On the other hand, the number of pieces of frame image data stored in the frame image data area is less than the predetermined number of frame images (Step S1007: No), the controller 119 determines that the frame image data corresponding to the number of frame images required for the moving image processing is not stored, and the procedure returns to Step S1001.

In Step S1008, the video output unit 109 reads the frame image data from the frame image data area of the memory 116, and conducts the moving image processing, to generate the moving image signal. In the subsequent Step S1009, the video output unit 109 outputs the generated moving image signal to the display panel 110. The video of the moving image is displayed on the display panel 110.

In this manner, at the time of search reproduction, the frame images are generated based on the LF data within the pixel region corresponding to the central part of the microlens 102a, and the frame images having photographing times proximate to each other are added. Accordingly, the frame image having a large depth of field with the improved S/N ratio is generated, to thereby allow the moving image having a large depth of field to be obtained, which allows the user to obtain the image excellent in visibility even at the time of search reproduction.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-213649, filed Oct. 20, 2014, and Japanese Patent Application No. 2014-213646, filed Oct. 20, 2014, which are hereby incorporated by reference herein in their entirety.

What is claimed is:

1. An image processing apparatus comprising:
a memory that stores instructions; and
a processor that executes the instructions to cause the image processing apparatus to function as:
an image data generating unit generating image data based on a signal received from an image pickup element comprising a unit pixel including a plurality of pixels allocated to each of a plurality of microlenses;
a frame image generating unit generating a frame image for reproduction of a moving image based on data, within the image data, read from a predetermined read region of the unit pixel; and
a changing unit changing the predetermined read region of the unit pixel for the frame image generating unit depending on a reproduction mode relating to the reproduction of the moving image,
wherein the reproduction mode comprises a normal reproduction mode and a search reproduction mode, and
wherein a moving image reproduction speed for the search reproduction mode is higher than a moving image reproduction speed for the normal reproduction mode.

2. The image processing apparatus according to claim 1, wherein the frame image generating unit reads, when the reproduction mode is the search reproduction mode, data corresponding to a part of pixels within the plurality of pixels corresponding to the unit pixel.

3. The image processing apparatus according to claim 1, wherein the frame image generating unit restricts, when the reproduction mode is the search reproduction mode, the reading of data on pixels corresponding to a peripheral edge portion of one of the plurality of microlenses within the unit pixel.

4. The image processing apparatus according to claim 1, wherein the frame image generating unit generates, when the reproduction mode is the search reproduction mode, the frame image by adding the image data on a plurality of frames that are proximate to one another in a time axis.

5. The image processing apparatus according to claim 1, wherein the frame image generating unit generates, when the reproduction mode is the search reproduction mode, the frame image for every predetermined number of frames.

6. An image processing method comprising the steps of:
generating image data based on a signal received from an image pickup element comprising a unit pixel including a plurality of pixels allocated to each of a plurality of microlenses;
generating a frame image for reproduction of a moving image based on data, within the image data, read from a predetermined read region of the unit pixel; and
changing the predetermined read region of the unit pixel for the generating of the frame image generating unit depending on a reproduction mode relating to the reproduction of the moving image,
wherein the reproduction mode comprises a normal reproduction mode and a search reproduction mode, and
wherein a moving image reproduction speed for the search reproduction mode is higher than a moving image reproduction speed for the normal reproduction mode.

7. A non-transitory computer-readable storage medium having stored thereon a program to be executed by a computer of an image processing apparatus configured to reproduce a moving image, the program causing the computer to function as: an image data generating unit generating image data based on a signal received from an image pickup element comprising a unit pixel including a plurality of pixels allocated to each of a plurality of microlenses; a frame image generating unit generating a frame image for reproduction of a moving image based on data, within the image data, read from a predetermined read region of the unit pixel; and a changing unit changing the predetermined read region of the unit pixel for the frame image generating unit depending on a reproduction mode relating to the reproduction of the moving image, wherein the reproduction mode comprises a normal reproduction mode and a search reproduction mode, and wherein a moving image reproduction speed for the search reproduction mode is higher than a moving image reproduction speed for the normal reproduction mode.

* * * * *